GRAIN DRYING PROCESS AND APPARATUS

Original Filed Jan. 3, 1967 4 Sheets-Sheet 1

INVENTORS
CHARLES M. KLINE
& ALBERT M. BEST
BY Walter V. Wright
AGENT

GRAIN DRYING PROCESS AND APPARATUS
Original Filed Jan. 3, 1967 4 Sheets-Sheet 2
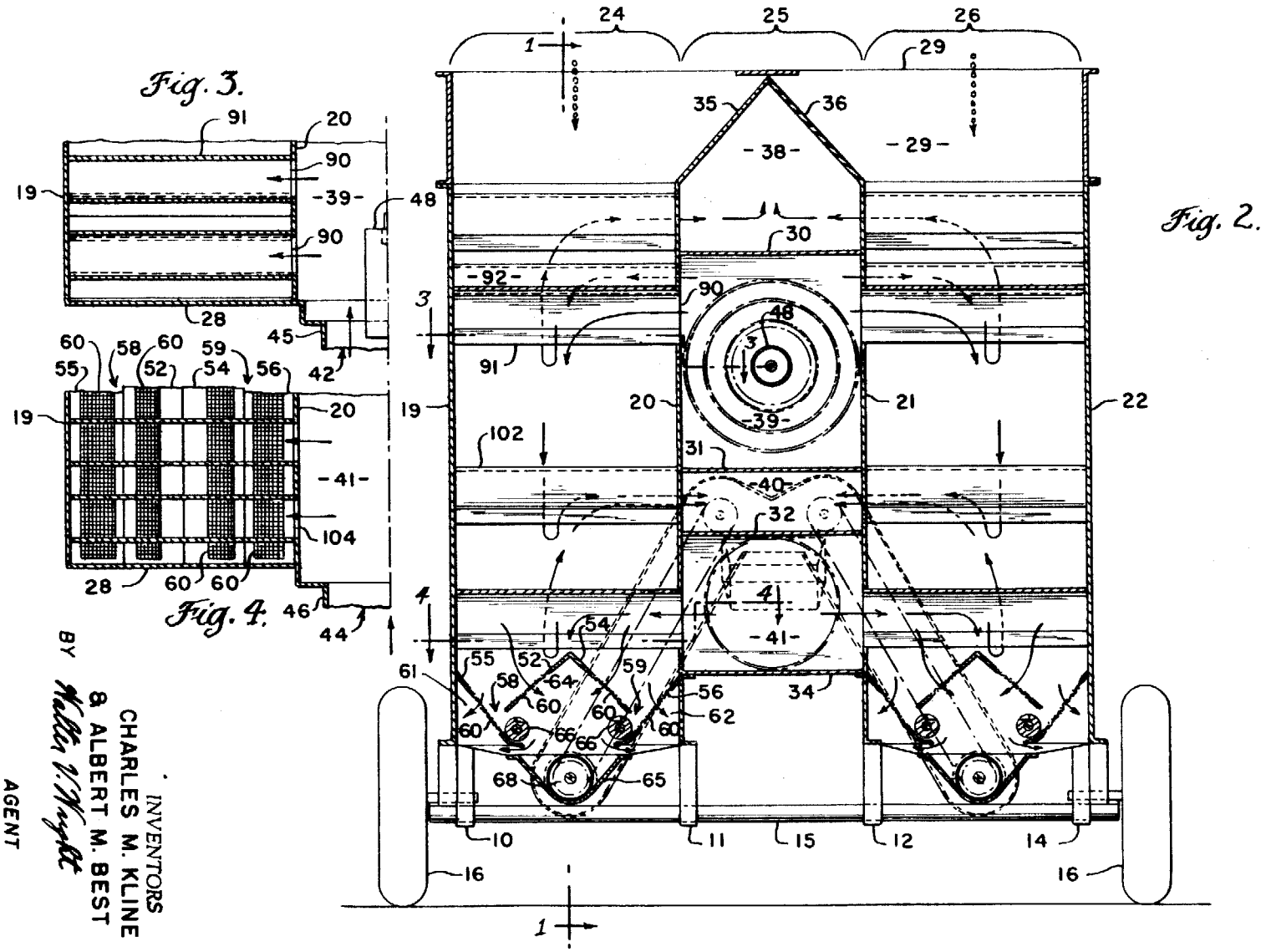
INVENTORS
CHARLES M. KLINE
& ALBERT M. BEST
BY Walter V. Wright
AGENT

GRAIN DRYING PROCESS AND APPARATUS

Original Filed Jan. 3, 1967 4 Sheets-Sheet 3

INVENTORS
CHARLES M. KLINE
& ALBERT M. BEST
BY Walter V. Wright
AGENT

GRAIN DRYING PROCESS AND APPARATUS

Original Filed Jan. 3. 1967 4 Sheets-Sheet 4

INVENTORS
CHARLES M. KLINE
& ALBERT M. BEST
BY Walter V. Wright
AGENT

United States Patent Office

Re. 27,030
Reissued Jan. 12, 1971

27,030

GRAIN DRYING PROCESS AND APPARATUS

Charles M. Kline, Reinholds, and Albert M. Best, New Holland, Pa., assignors to Sperry Rand Corporation, a corporation of Delaware Original No. 3,373,503, dated Mar. 19, 1968, Ser. No. 606,968, Jan. 3, 1967. Application for reissue Feb. 11, 1970, Ser. No. 10,549

Int. Cl. F26b *3/14, 17/12*

U.S. Cl. 34—33 9 Claims

Matter enclosed in heavy brackets [ ] appears in the original patent but forms no part of this reissue specification; matter printed in italics indicates the additions made by reissue.

ABSTRACT OF THE DISCLOSURE

A continuous grain flow grain drying process and apparatus having air inlet and exhaust ducts particularly relatively located to enable the use of considerably higher drying air temperatures than those of conventional grain driers.

BACKGROUND OF THE INVENTION

Before grain can be safely stored in bulk storage bins, or the like, the moisture content of the grain must be lowered below certain limits. Excessive moisture results in heat and spoilage of the grain in storage.

The usual grain drying process consists of placing the grain in a confined area and forcing hot dry air into and through the area to carry off moisture from the grain. Although the process is basically simple, it involves a difficult balancing of the wide ranging variables of drying air temperature and drying time. The hotter the air, the more efficiently it removes moisture from the grain and the shorter the required drying time, but the more likely it is to produce stress cracks in the hulls of the grain kernels where the hot dry air contacts the cold wet grain. Lower air temperatures reduce the probability of grain cracking, but remove moisture less efficiently and, therefore, increase the cost of moisture removal by requiring more air and longer operating times. The longer the operating time, the greater the likelihood of some kernels becoming overheated and charred. The quality and value of the grain decreases as the percentage of cracked and charred kernels increases.

In an effort to minimize kernel cracking and charring, conventional operations have generally settled upon the use of conservative air temperatures and extended drying times. In order to achieve a satisfactory grain volume capacity with these time and temperature proportions, conventional operations have been commonly built to massive physical proportions. Thus, conventional drying apparatus is usually expensive to construct and operate. It also lacks mobility because of its size.

SUMMARY OF THE INVENTION

The present invention comprises a grain drying process and apparatus which safely enables the use of considerably higher air temperatures than those used in conventional systems. In other systems, as in the present invention, the air temperatures and drying times must be varied somewhat in accordance with the type of grain being dried and other factors, such as the percentage of moisture in the grain and the ambient air temperature and relative humidity; consequently, specific temperature figures are, per se, of little value for purposes of comparison. It may be more significantly stated that the present invention involves the use of air temperatures in a range which would be likely to produce considerable kernel stress cracking or charring in conventional systems for a given set of conditions. For one example, air in the 300–350° F. temperature range may be employed to dry shelled corn, according to the present invention, to a quality equal to, or better than, that of corn dried by conventional systems using 180° F. air.

This is accomplished by gravitating a stream of the grain to be dried downwardly through a vertical passage. Thus, the size of the apparatus has little relationship to the total volume of grain to be dried. It need be constructed only large enough to accommodate the portion of grain in the stream. The hot air is delivered to a single relatively narrow horizontal zone of the vertical grain passage. In this zone the drying efficiency is very high. The grain gravitates through the single high temperature zone in a relatively short time interval, before damage can occur. The natural flow characteristics of air through grain are utilized to strategically locate two horizontal zones, respectively above and below the hot air inlet zone where the air is exhausted from the passage. The exhaust ducts are located so that a major portion, approximately two-thirds, of the hot air travels upwardly from the hot air inlet zone through the stream of grain to the upper exhaust zone. The remaining one-third portion of the hot air travels downwardly from the hot air inlet zone parallel with the direction of flow of the stream of grain to the lower exhaust zone. The duct arrangement of the present invention considers not only the effects of the hot air on the grain, but also considers and utilizes the conditioning effect of the grain on the hot air to enable the use of maximum temperature drying air.

The downwardly gravitating stream of grain is first contacted by the drying air at the level of the upper air exhaust zone. By the time the air has risen from the hot air inlet zone to the upper exhaust zone, it has picked up moisture from the grain and its temperature has been reduced by the heat given up to the grain. As the stream of grain gravitates downwardly through the upwardly flowing hot air, it contacts progressively hotter, drier air until the grain reaches the horizontal level of the hot air inlet zone. This gradual but thorough preheating conditioning of the grain prevents the grain from undergoing sudden drastic temperature changes when it moves into the high temperature air inlet zone, thereby avoiding the formation of stress cracks in the grain. After passing through the hot air inlet zone, the grain travels downwardly toward the second air exhaust zone along with the remaining portion of hot air which travels downwardly to the lower exhaust zone. In travelling donwardly between the air inlet zone and the lower air exhaust zone, the air continues to remove moisture from the grain, but at a progressively reduced rate as the lower exhaust zone is approached. By the time the grain kernels have reached the lower hot air exhaust zone, drying is virtually complete and the kernel temperature has been gradually reduced, by the hot air which had been conditioned by the moisture received from the grain and by the evaporation of some of this moisture. The grain will not be subject to stress cracking if contacted by air at ambient air temperatures. The present invention also provides for ambient air to be forced into, through and out of the stream of grain at strategically located horizontal zones below the drying zone if it is desired to cool the grain to a temperature suitable for immediate storage. The utilization of the conditioning effect of the grain upon the air to control the rate of increase and decrease of kernel temperatures enables the safe use of such high initial air temperature.

The capacity of this operation is high relative to the size of the machine. The apparatus is of small size and of simple construction since relatively few ducts are employed and these are located in specific horizontal zones. The cost of moisture removal is low since the high air temperatures are very efficient in removing moisture from the grain. Additional economies are realized in all the moving mechanical components of the apparatus, such as fans and motors, because of the reduced size of the apparatus. The total volume of air employed is low and the drying time is minimized without increasing grain damage relative to conventional systems. Drying capacity competitive with custom drying operations is achieved by the present process utilizing an inexpensive, mechanically simple apparatus of a size that is readily portable in trailer form.

BRIEF DESCRIPTION OF THE DRAWINGS

FIG. 2 is a sectional view taken on the line 2—2 of FIG. 1;

FIG. 3 is a fragmentary sectional view taken on the line 3—3 of FIG. 2;

FIG. 4 is a fragmentary sectional view taken on the line 4—4 of FIG. 2;

DESCRIPTION OF THE PREFERRED EMBODIMENTS

Figure 1:
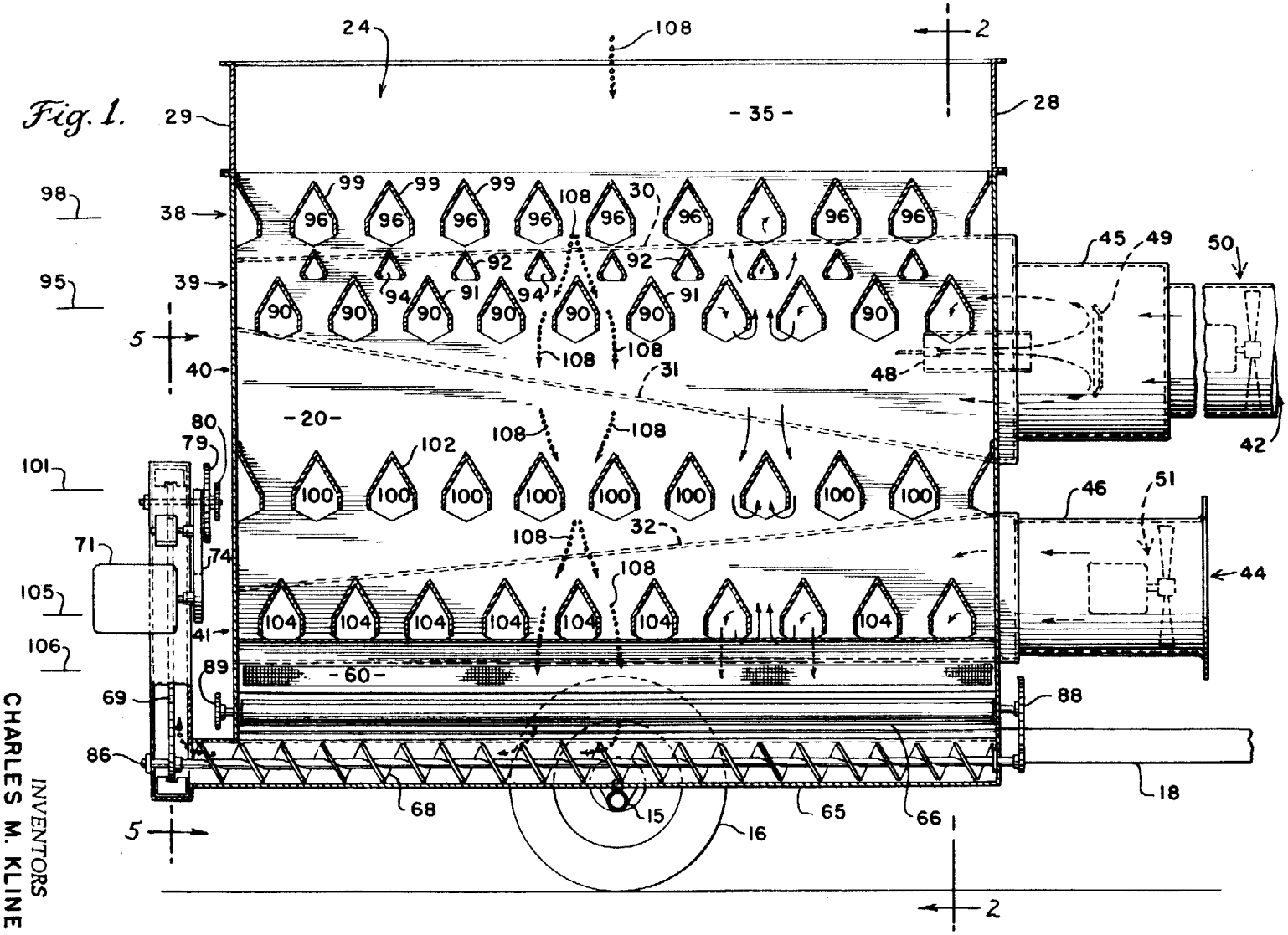
FIG. 1 is a longitudinal sectional view of the grain drying apparatus of the present invention taken on the line 1—1 of FIG. 2.

The base frame of the apparatus of the present invention is in the form of a trailer and includes longitudinally extending bottom frame rails 10, 11, 12, and 14 best seen in FIG. 2 of the drawings. The longitudinal frame rails are interconnected by transverse frame members, one of which is visible in FIGS. 1 and 2 and indicated by the reference numeral 15. The base frame is supported on ground wheels 16 and may be towed over the ground by a draft tongue 18, visible in FIG. 1.

As best seen in FIG. 2, the main body of the drying apparatus is divided into three vertical sections by longitudinally extending vertical walls 19, 20, 21, and 22. The three vertical sections are identified at the top of FIG. 2 by the reference numerals 24, 25, and 26, respectively. Except for certain openings in center section 25, which will be explained later, the forward and rear ends of the apparatus are closed by vertical end walls 28 and 29. The outer sections 24 and 26 constitute vertical grain drying passages while the center section 25 is divided into a pair of plenum chambers and a pair of air exhaust passages by horizontal dividing walls 30, 31, 32, and 34. The top of the central section 25 is closed by downwardly diverging wall plates 35 and 36.

In FIG. 2, the space between wall plates 35 and 36 and horizontal divider wall 30 constitutes a discharge air passage 38. The space between divider walls 30 and 31 constitutes a plenum chamber 39. The space between divider walls 31 and 32 constitutes and air exhaust passage 40. The space between divider walls 32 and 34 constitutes a plenum chamber 41. The air passages 38 and 40 of the central section 25 are open at the ends through end walls 28 and 29. The plenum chambers 39 and 41 are closed at the back end of the apparatus by end wall 29 and have openings 42 and 44, respectively (see FIGS. 3 and 4) through the front wall 28 of the unit.

The plenum chamber inlet openings 42 and 44 are defined, respectively, by tunnel-like housings 45 and 46. As may be seen in FIG. 1, a burner 48 and a heat deflector shield 49 are mounted in the inlet tunnel to upper plenum chamber 39. A fan, indicated by the reference numeral 50, is also mounted in the tunnel 45 to force air into the upper plenum chamber. Obviously, the air is heated by the burner 48. A second fan 51 is supported in the lower plenum chamber entrance tunnel 46 to force cool air into lower plenum chamber 41. Note in FIG. 1, that the divider walls 30, 31, and 32, while they are horizontal in the transverse direction, have a vertical tapering relationship to each other in the fore-and-aft direction. The tapering of the walls 30, 31, and 32 of the plenum chambers 39 and 41 from the fan, or forward, end of the device to the rear wall 29 provides for substantially uniform air pressure throughout the length of the plenum chambers.

It will be apparent in FIG. 2 that the outer vertical passages 24 and 26 are identically constructed. The central air passage and plenum chamber section 25 serves both grain drying passages 24 and 26 identically. The following description of vertical drying passage 24 is equally applicable to drying passage 26. A pair of downwardly diverging walls 52 and 54 near the bottom of vertical passage 24 coact with a pair of downwardly converging walls 55 and 56 to define, respectively, a pair of grain discharge openings 58 and 59. Each of the walls 52, 54, 55, and 56 is provided with a screen panel 60 (see FIG. 4) which allows air to pass through the wall while being imprevious to the grain. The passages 61, 62, and 64 which underlie the walls 55, 56, 52, and 54 are open to the atmosphere to exhaust the air passing through screen panels 60 from the device.

An auger housing 65 underlies the bottom of grain drying passage 24. The sides of the auger housing form continuations of the downwardly converging bottom walls 55 and 56. Two metering rolls 66 are disposed in the passages 58 and 59 through which the downwardly gravitating grain is discharged from drying passage 24. The metering rolls 66 regulate the rate at which grains can pass through the discharge openings 58 and 59. As may be seen in FIG. 1, the metering rolls 66 discharge the grain downwardly into an auger 68 disposed in the auger housing 65. The metering rolls and the auger extend the full length of the grain drying device. Rearwardly of end wall 29 is an upwardly inclined drag conveyor 69 which elevates the grain from auger housing 65 and discharges it from the device through a discharge opening 70 visible in FIG. 5. From the discharge opening 70 the grain is allowed to drop into an additional conveyor or container not constituting a part of the present invention.

Figure 5:
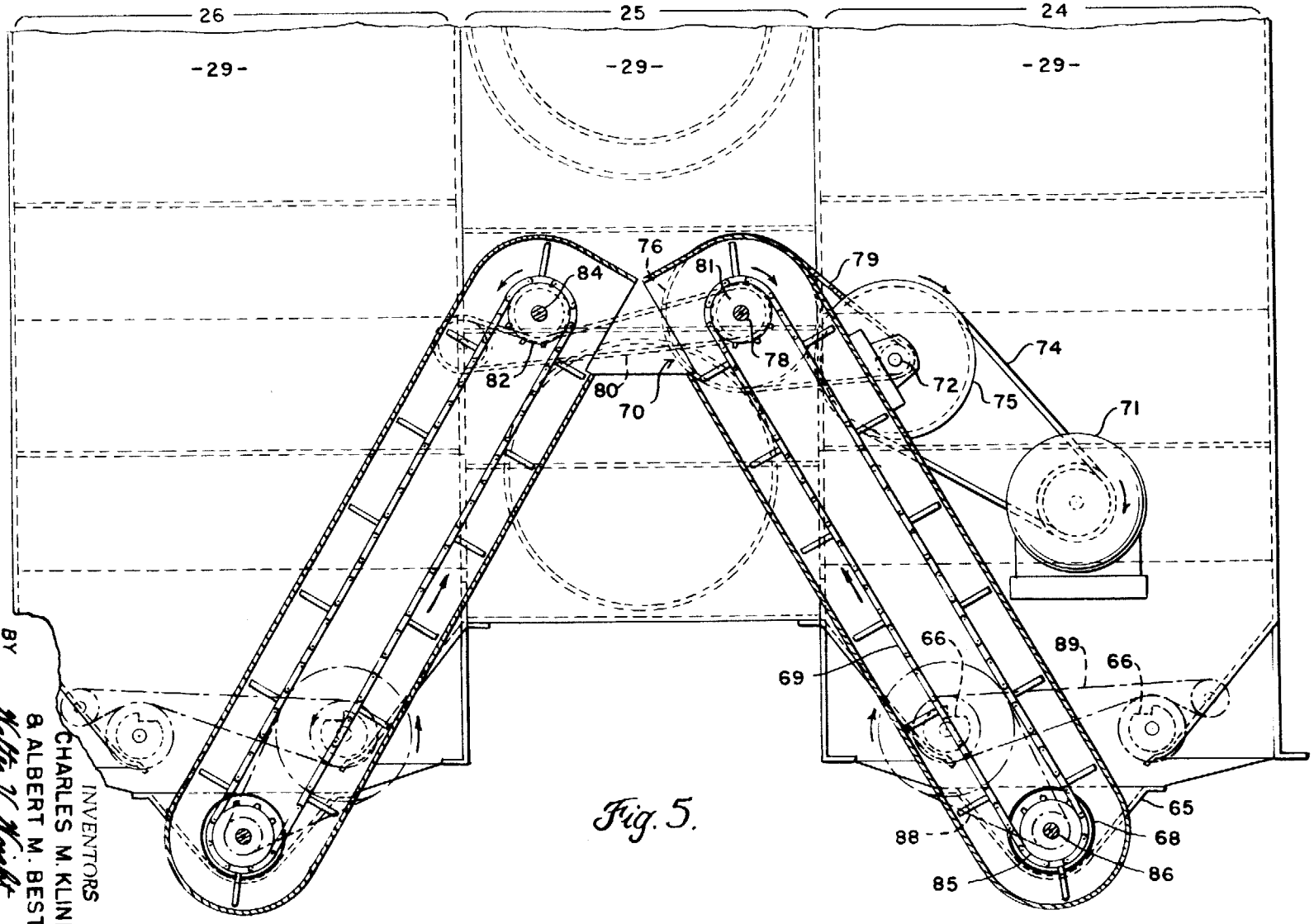
FIG. 5 is a fragmentary enlarged sectional view taken on the line 5—5 of FIG. 1.

The drive for the metering rolls, auger, and drag conveyor can be followed most clearly in FIG. 5 wherein drive power is supplied from an electric motor 71 to a jack shaft 72 via a V-belt 74 and large diameter pulley 75 on the jack shaft. The jack shaft 72 drives a large sprocket 76 fixed on a shaft 78 via an endless chain 79. The shaft 78 constitutes the upper shaft of the drag conveyor 69. An endless chain 80 is entrained about sprocket 81 and 82 mounted, respectively, on shaft 78 and on the upper shaft 84 of the drag conveyor for vertical drying passage 26. The drag conveyor chain 69 drives a sprocket 85 at the lower end of the drag conveyor. Sprocket 85 is fixed on a shaft 86 which, as may be seen in FIG. 1, constitutes an extension of the shaft of auger 68. The inboard metering roll 66 is driven from shaft 86 by an endless chain 88 which may be seen in FIG. 1 at the front of the machine and which is indicated in FIG. 5 in phantom lines. The outboard side metering roll 66 is driven by an endless chain 89 from the inboard metering roll. The endless chain 89 is indicated in phantom lines in FIG. 5 and may be seen in FIG. 1 at the rear of the drying apparatus in general.

In FIGS. 1 and 2 it may be seen that a series of ducts 90 interconnect the upper plenum chamber 39 and the grain drying passage 24. The ducts 90 are arranged in a single horizontal zone as may be seen in FIG. 1, and this zone has a predetermined elevation indicated by the line 95 at the left of FIG. 1. Each duct 90 has an inverted wedge shaped covering 91 which extends transversely across drying passage 24 between the vertical walls 19 and 20. A horizontal series of grain deflecting baffles 92 are also visible in FIG. 1. These baffles 92 are primarily for the purpose of controlling the down flow of grain in the passage 24. However, each baffle 92 overlies a small opening 94 through wall 20 into plenum chamber 39. Thus, the openings 94 do serve to conduct a certain amount of air from plenum chamber 39 into the hot air inlet zone of ducts 90. The term "elevation" as employed herein denotes the linear level of a horizontal air duct zone in vertical grain drying passage 24 at which the mass of air passing through the ducts in that horizontal zone may be said to be concentrated. Thus, the elevation of the air inlet duct zone comprising ducts 90 and openings 94 under baffles 92 is indicated by the line 95 seen at the left side of FIG. 1 of the drawings. A horizontal series of ducts 96 may be seen in FIG. 1 above ducts 90 and baffles 92. The ducts 96 interconnect grain drying passages 24 and the uppermost air discharge passage 38 of central section 25. As will be seen in FIG. 1 the ducts 96 are located in a single horizontal zone and the elevation of their zone is indicated by the line 98 at the left side of FIG. 1. Each duct 96, like the air inlet ducts 90, is covered by an inverted wedge shaped grain deflecting shield 99. A third horizontal series of ducts 100 connect grain drying passage 24 with air discharge passage 40 of the central section 25 of the crop drier. The ducts 100 are located in a single horizontal zone whose elevation is indicated by the line 101 at the left side of FIG. 1 of the drawings. Each of the ducts 100, like the previously described ducts, is covered by a grain deflecting baffle 102 of inverted wedge shaped configuration. A fourth horizontal series of ducts 104 communicates between grain drying passage 24 and lower plenum chamber 41. The elevation of this horizontal duct zone is indicated by the line 105 at the left of FIG. 1 of the drawings. One additional line indicated by the reference numeral 106 is identified at the left side of FIG. 1 of the drawings. This line 106 indicates the elevation of the exhaust zone afforded by the screen panels 60 in the previously described sloping walls 52, 54, 55, and 56 at the bottom of the grain bin.

In operation, the passage 24 is initially filled with wet grain and a "head" of grain is maintained at the top of the device to keep passage 24 full as grain is withdrawn from the bottom and carried away by auger 68. The operation of metering rolls 66 and auger 68 causes the column of grain in passage 24 to gravitate steadily downwardly as indicated in FIG. 1 by the arrows 108. Hot dry air enters the grain column from upper plenum chamber 39 at ducts 90. Approximately two-thirds of the total volume of heated air rises upwardly through the downwardly flowing grain column and is discharged through ducts 96. As this volume of air progresses upwardly from ducts 90 toward ducts 96, it gives up heat to the grain and becomes progressively cooler. The coldest wettest grain comes in contact with the air initially in the zone of ducts 96. Since the air at the level of ducts 96 has been cooled somewhat from having travelled upwardly through the grain, it does not cause an abrupt temperature change on the grain kernel surfaces at ducts 96. Instead, it begins a gradual warming of the cold wet grain. As the grain gravitates toward the level of ducts 90, it comes into contact with progressively hotter drier air. The grain is thereby gradually preheated and the kernel temperature equalized in preparation for contact with the air having the highest temperature at the level of ducts 90. This kernel preheating operation safely enables the use of higher air temperatures than those practical with conventional driers.

The remaining one-third of the volume of air entering through ducts 90 travels downwardly parallel with the grain flow to the level of exhaust ducts 100. Due to moisture evaporation and the time interval involved in traversing the greater distance between ducts 90 and 100, the temperature of both the air and grain is gradually reduced as the level of exhaust ducts 100 is approached. There is no sudden temperature change. At the level of ducts 100, drying has been accomplished plus some reduction of kernel temperature.

Ambient temperature air has meanwhile been entering ducts 104 from lower plenum chamber 41. Approximately two-thirds of the volume of air entering ducts 104 travels downwardly and exhausts through screen panels 60. The remaining one-third of this air volume travels upwardly through the grain and exhausts through ducts 100. This air is gradually warmed by the heat it picks up from the grain between ducts 104 and 100 so that at the level of exhaust ducts 100 it has nearly reached the temperature of the grain moving downwardly to ducts 100. Again, the grain is subjected to no sudden temperature changes. The grain is progressively cooled between ducts 100 and 104. Below ducts 104, the final blast of cooling air travelling from ducts 104 through screen panels 60 reduces the grain to temperatures suitable for immediate bulk storage. The volume of air travelling in each direction from the air inlet zones is controlled by the location of the air exhaust zones, based on flow characteristics of air through grain.

As may be seen in FIG. 1, the vertical spacing between the duct zone elevations 95 and 101 is substantially twice as great as the distance between elevations 95 and 98. The distance between elevations 105 and 101 is substantially twice as great as the distance between elevations 105 and 106. This proportional spacing has been found to yield a most uniformly gradual transition of grain from an initial cool wet condition through the desired hot dry condition and then to the resultant cool dry final state. This results in maximum drying efficiency, low operating cost, low apparatus construction cost, and minimum grain damage. At no time are any cold wet kernels subjected to the hottest air; and at no time are any hot dry kernels subjected to the coolest (ambient air temperature) air.

Figure 6:
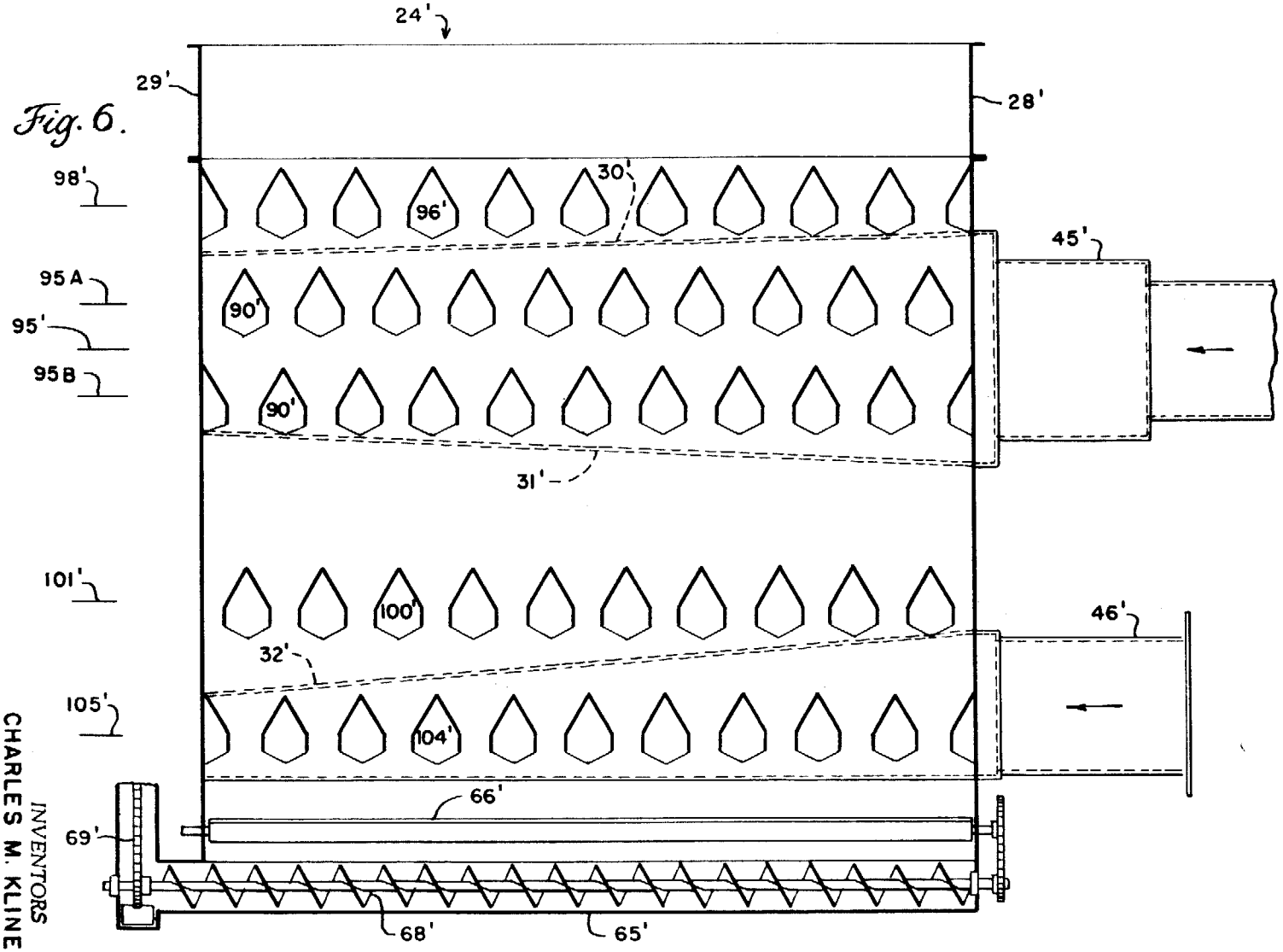
FIG. 6 is a diagrammatic longitudinal sectional view similar to FIG. 1 illustrating a modified embodiment of the apparatus.

The embodiment illustrated in FIG. 6 is essentially the same as that of FIG. 1. Similar elements have been identified by the same reference numerals as in FIG. 1 accompanied by "prime" symbols. In the FIG. 6 embodiment the horizontal hot air inlet zone has simply been widened in the vertical direction in comparison to the FIG. 1 embodiment. This has been accomplished by providing two horizontal series of inlet ducts 90' for the single hot air inlet zone. The preheating zone, which is indicated by the vertical distance between elevation lines 98' of the upper exhaust zone and upper elevation line 95A of the hot air inlet zone, is the same as in the FIG. 1 embodiment. The final drying and precooling zone, indicated by the vertical distance between elevation lines 95B and 101' is also the same as in the FIG. 1 embodiment. The elevation of the drying zone, in general, is at 95' which is also approximately twice as close to the elevation 98' as it is to the elevation 101'.

The major difference between the two embodiments is that in the FIG. 6 embodiment the grain is afforded a soaking period in the major drying zone. The soaking period is provided by the distance between the elevation 95A of the upper series of hot air inlet ducts 90' and the elevation 95B of the lower series of horizontal air inlet ducts 90'. There is essentially no air movement between the elevations 95A and 95B since the pressure of the incoming air is equal at these two elevations. The soaking period enables a better equalizing of moisture within the kernels between the two periods of maximum temperature exposure at the levels of ducts 90'. Kernel temperatures are rendered more uniform by the provision of a "tempering zone" between the two levels of air inlet ducts 90'. The kernel temperature may be reduced slightly in this area because of the movement of moisture to the exterior surface of the kernels and subsequent evaporation. This increases the drying effectiveness of the operation in the zone between elevations 95B and 101'.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A grain drying process comprising, gravitating a stream of grain to be dried downwardly through a vertical passage, forcing high temperature air into said stream of grain in a first concentrated horizontal zone, exhausting a major portion of said air from said stream of grain at a second concentrated horizontal zone located a predetermined distance in the upstream direction from said first horizontal zone thereby filtering a major portion of said air upstream through said stream of grain to *gradually* preheat the grain prior to arrival of the grain at said first horizontal high temperature air inlet zone, exhausting the remaining portion of said air from said stream at a third concentrated horizontal zone located substantially twice said predetermined distance in the downstream direction from said first zone whereby said remaining portion of said air travels downstream with said stream of grain to [control the cooling rate of] *dry* grain moving downwardly out of said first horizontal high temperature air zone *with a gradual reduction in air temperature so that processed grain is gradually heated and dried* to prevent the formation of stress cracks in said grain.

2. The grain drying process recited in claim 1 characterized by the fact that the temperature of said air forced into said first zone is high enough to produce stress cracks in the outer surface of kernels of ambient air temperature grain if the grain were introduced directly into said air inlet zone.

3. The grain drying process recited in claim 1 further characterized by the steps of forcing air at ambient air temperature into said stream of grain at a fourth concentrated horizontal zone located a predetermined distance in the downstream direction from said third horizontal zone whereby a first portion of said forced ambient temperature air filters upstream through said stream of grain from said fourth horizontal zone to said third horizontal zone to pre-cool the grain prior to its arrival at said fourth horizontal zone, exhausting said portion of said forced ambient temperature air at said third zone, exhausting the remaining portion of said forced ambient temperature air from said stream of grain at a fifth horizontal zone located substantially half as far downstream from said fourth horizontal zone as the distance between said third and fourth horizontal zones whereby said remaining portion of said forced ambient temperature air travels downstream from said fourth horizontal zone with said stream of grain to substantially cool the grain to ambient air temperature as the grain graviates to said fifth horizontal zone.

4. Grain drying apparatus comprising the combination of structure defining a generally upright [columnar] passage open at the top to receive moist grain for drying and open at the bottom to discharge dry grain whereby grain introduced into said passage at the top gravitates downwardly through said passage, a first series of air outlet ducts for discharging air from said [columnar] passage to the exterior of said structure when said passage is filled with grain, said first series of outlet ducts being disposed in a horizontal zone at a predetermined elevation in said [columnar] passage, a second series of outlet ducts for discharging air from said [columnar] passage to the exterior of said structure, said second series of outlet ducts being disposed in a horizontal zone in said [columnar] passage at an elevation spaced below said predetermined elevation of said first series of outlet ducts, a series of inlet ducts for admitting air from the exterior of said structure into said [columnar] passage, said series of inlet ducts being disposed in a horizontal zone between said first and second series of air outlet ducts and at an elevation located substantially twice as far above the elevation of said second series of outlet ducts as below the elevation of said first series of outlet ducts, and means for heating air and delivering the heated air to said series of air inlet ducts whereby the heated air contacts the grain in said [columnar] passage at maximum temperature as the grain gravitates through the horizontal zone of said series of inlet ducts, said air travelling upwardly and downwardly through the grain in said passage from said inlet zone to said first and second series of outlet ducts thereby providing grain gradually *preheating* [and pre-cooling zones] in said passage above [and below] said high temperature air inlet zone *and to dry grain with a gradual reduction in air temperature below said air inlet zone* to prevent the formation of stress cracks in [said] *the processed* grain.

5. Grain drying apparatus as recited in claim 4 including a second series of air inlet ducts for admitting air from the exterior of said structure into said [columnar] passage, said second series of inlet ducts being spaced below said second series of outlet ducts, and means for delivering ambient air to said second series of air inlet ducts to [further] cool the grain in said passage after it gravitates through the horizontal zone of said second series of air outlet ducts.

6. Grain drying apparatus comprising the combination of structure defining a generally upright [columnar] passage having an inlet opening at the top to receive moist grain for drying and a discharge opening at the bottom to discharge dry grain from said passage, a first series of air outlet ducts for exhausting air from said [columnar] passage to the exterior of said structure, said first series of outlet ducts being disposed in a first horizontal zone at a predetermined elevation in said [columnar] passage, a second series of outlet ducts for exhausting air from said [columnar] passage to the exterior of said structure, said second series of outlet ducts being disposed in a second horizontal zone in said [columnar] passage at an elevation spaced below said predetermined elevation of said first series of outlet ducts, a first series of inlet ducts for admitting air from the exterior of said structure into said [columnar] passage, said first series of inlet ducts being disposed in a single horizontal zone between said first and second series of air outlet ducts and at an elevation located substantially twice as far above the elevation of said second series of outlet ducts as below the elevation of said first series of outlet ducts, a second series of inlet ducts for admitting air from the exterior of said structure into said [columnar] passage, said second series of inlet ducts being disposed in a horizontal zone between said second series of outlet ducts and said discharge opening at the bottom of said passage and at an elevation located substantially twice as far below the elevation of said second series of outlet ducts as above said discharge opening, means on said structure for heating air and delivering the heated air to said first series of air inlet ducts, and means delivering unheated ambient air to said second series of air inlet ducts.

7. Grain drying apparatus as recited in claim 6 wherein said grain discharge opening at the bottom of said [columnar] passage is defined by downwardly converging walls, said walls having portions pervious to air and impervious to grain.

8. Grain drying apparatus as recited in claim 7 including power driven rotary metering means operatively associated with said grain discharge opening at the bottom of said [columnar] passage to control the rate of discharge of grain through said discharge opening thereby controlling the rate at which the grain in said [columnar] passage gravitates downwardly therethrough.

9. Grain drying apparatus as recited in claim 8 wherein said structure includes a conduit disposed to receive grain from said metering means, a passageway communicating with said air pervious grain impervious portions of said walls for directing air to the exterior of said structure, and conveyor means in said conduit to deliver grain outwardly from under said passage defining structure.

References Cited

The following references, cited by the Examiner, are of record in the patented file of this patent or the original patent.

UNITED STATES PATENTS

| | | | |
|---|---|---|---|
| 2,660,810 | 12/1953 | Hess | 34—170 |
| 2,759,274 | 8/1956 | Jonsson | 34—170X |
| 558,508 | 4/1896 | Metcalf | 34—170 |
| 2,946,132 | 7/1960 | Armstrong | 34—170 |
| 3,300,873 | 1/1967 | Bussell et al. | 34—170 |

EDWARD J. MICHAEL, Primary Examiner

U.S. Cl. X.R.

34—170